Nov. 25, 1930.     J. F. LAWSON     1,782,692
CUTTING MACHINE
Filed June 13, 1927     3 Sheets-Sheet 1
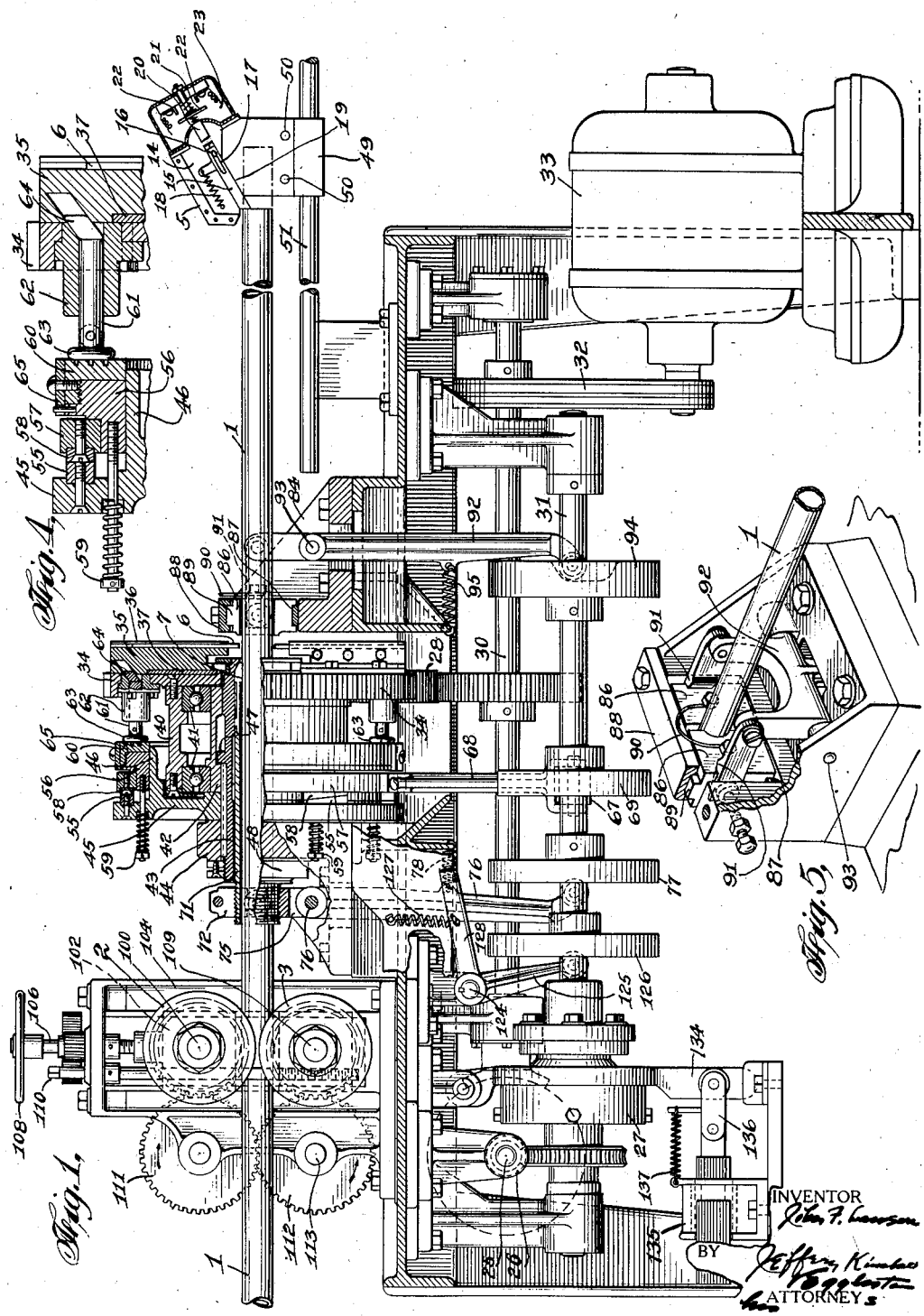

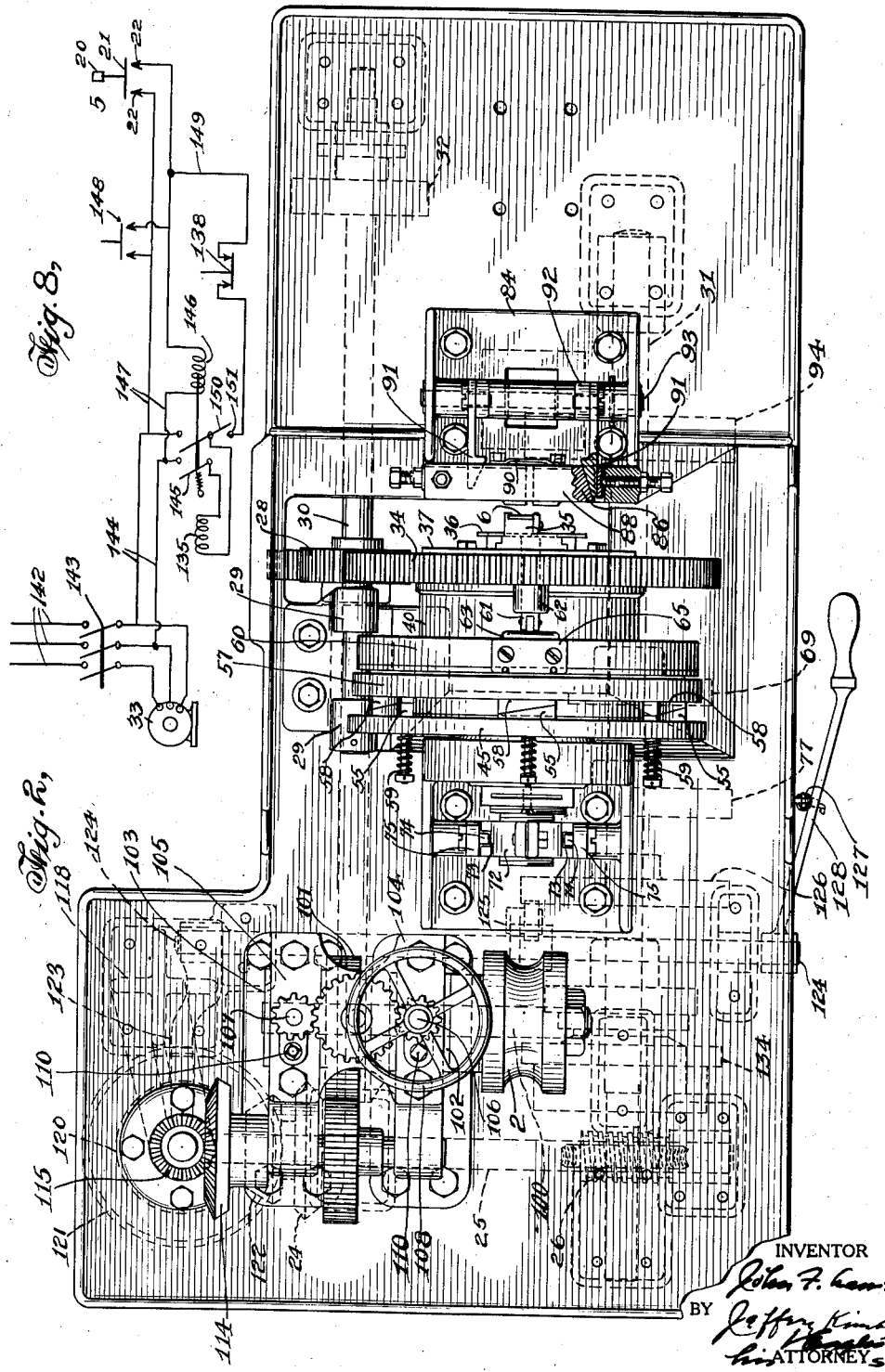

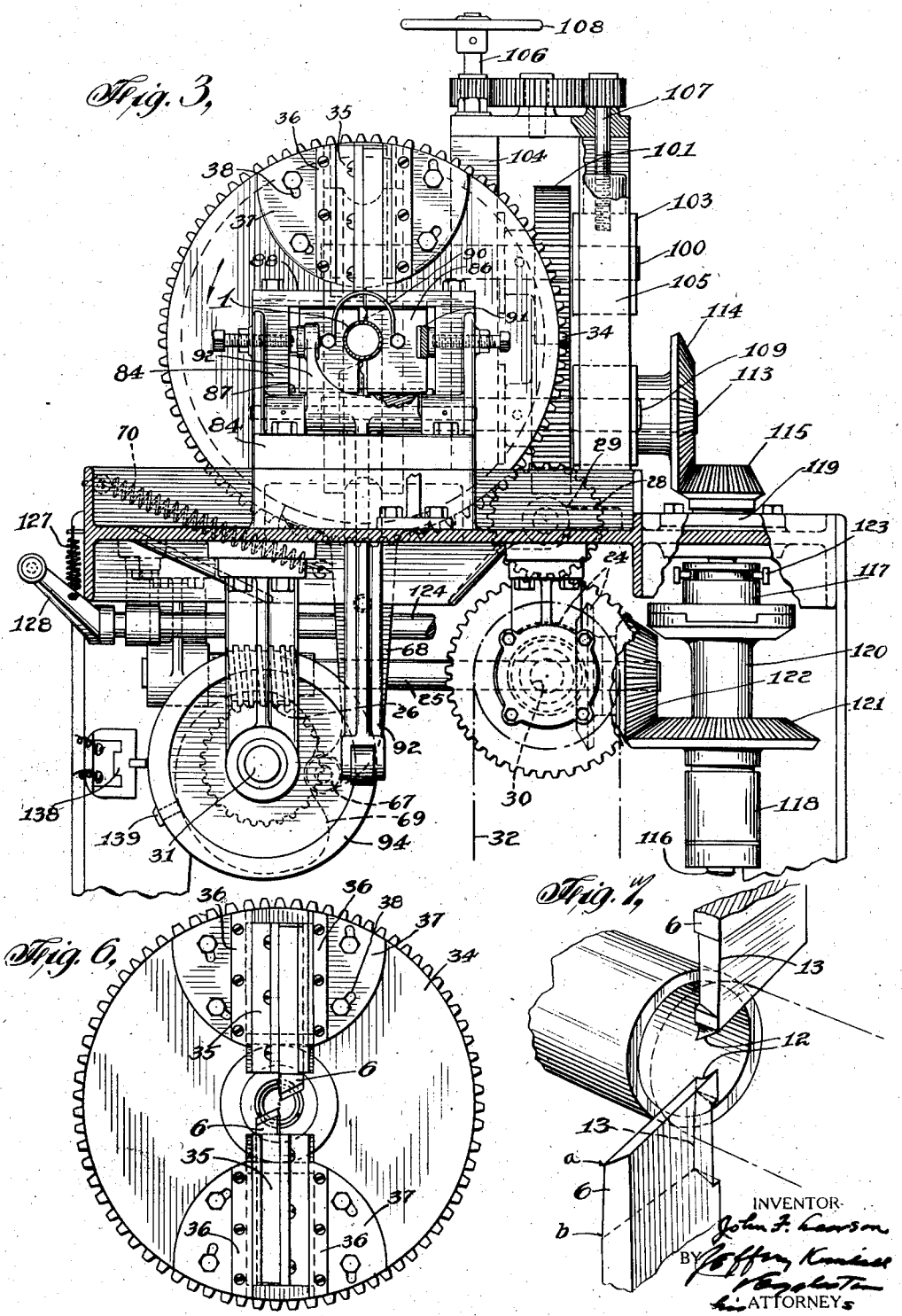

Patented Nov. 25, 1930

1,782,692

UNITED STATES PATENT OFFICE

JOHN F. LAWSON, OF BROOKLYN, NEW YORK, ASSIGNOR, BY MESNE ASSIGNMENTS, TO STEEL AND TUBES, INC., A CORPORATION OF OHIO

CUTTING MACHINE

Application filed June 13, 1927. Serial No. 198,570.

My invention concerns machines for making cuts in pipes, bars, etc., either completely severing the same or otherwise, and is directed toward trimming the sides of the cuts as well as making the cuts themselves, clamps or collets to support the work at both sides of the cut, an improved gauge of the electrical type for determining the position of the cut or measuring the length to be severed, the timing of the operation by timing cams (these being usually located on a cam shaft separate and apart from the power shaft), as well as certain other matters as hereinafter appears.

The accompanying drawings illustrate my invention in a machine especially intended for cutting pipe or tubing into rather short lengths. The invention is applicable to other purposes as well however, as appears above. Figure 1 is a side elevation of the machine, partly in section. Figure 2 is a plan view thereof, the gauge shown in Figure 1 being omitted. Figure 3 is an end view of the same machine, looking from the right of Figure 1, the driving motor and a part of the end of the base plate being omitted. Figure 4 is a detail of the mechanism for moving the cutting tools toward and from the work. Figure 5 is a detail of one of the clamps for the work. Figure 6 is an elevation illustrating the mounting of the cutting tools. Figure 7 is a diagrammatic view to illustrate the operation of the tools in cutting and trimming the work. Figure 8 is a diagram illustrating the electrical circuits of the machine.

The pipe or tube 1 constituting the work of the machine illustrated, enters the machine from the left of Figs. 1 and 2, and passes first through guide rolls 2 and 3 which may also be driven rolls for propelling the pipe. From the rolls 2 and 3 the pipe passes through the circular cutting head, and from thence to the gauge 5 which measures the length to be cut off. Internally of the head the pipe is gripped to the left of the cutting tools 6 by a collet, one jaw of which is shown at 7, and to the right of the tools by another clamp shown in detail in Figure 5. While the pipe 1 is being pushed through the cutting head, prior to each cut, the tools 6 are held retreated about as illustrated in Fig. 1 and the collet and clamp are released, but the collet and clamp hold the pipe firmly while the tools are moved in toward the axis of the pipe in making the cuts. The method in which the cutting tools 6 make the cut and trim the ends of the pipe is illustrated in Figure 7. Two cutting tools are employed ordinarily and these are located substantially diametrically opposite each other (see Figure 6); and they slide in ways substantially radial to the pipe. One end of each tool is sharpened to a cutting point and cutting edge as illustrated at 12; this cutting point and edge 12 initially sever the pipe as the two tools are moved inwardly toward the center of the pipe and simultaneously are carried circumferentially around the pipe (counter-clockwise in Fig. 6). Furthermore, one of the long edges of each tool is sharpened to a cutting edge 13 (Fig. 7), so that after the pipe is severed, the continued inward movement of the tools into the pipe brings these cutting edges 13 against (one against each of) the two new ends made by the severance. The tools thus trim these two ends as the tools are carried around the axis of the pipe subsequent to the actual depth cutting. The large surface of each tool adjacent the cutting edge 13 may slope inwardly toward the cutting edge 12 (as indicated by the slope of the line from a to b on the lower tool in Fig. 7), so that each cutting edge 13 will be forced into the adjacent end of the pipe by a straight line movement of the tool radially toward the pipe axis. On the completion of the severance and the subsequent trimming of the two new ends of the pipe by the edges 13 the tools are withdrawn again radially from the pipe axis so as to permit a new length of pipe to be fed past them and brought into proper positon for a second cut.

While it is obvious that such cutting and trimming may be done with the machine in which the succeeding lengths are measured by hand, a gauge can be used to measure automatically the succeeding lengths as before mentioned. For this purpose, I have placed the electric gauge switch 5 in position to be struck by the successive oncoming ends of the uncut tube and thereby a circuit closed (or opened) to initiate the cutting operation.

This gauge may be adjustably mounted so that it can be placed at any appropriate distance from the cutting tools and hence arranged to direct the cutting of pieces of any desired length within the capacity of the machine. For example, as shown in Fig. 1, the switch 5 may be carried by a clamp 49 grasping a gauge rod 51 mounted on, said, some stationary part of the machine and extending parallel to the path of travel of the pipe or tube 1 within the machine; the clamping bolts 50 permit the clamp to be freed from the gauge rod at will and fixed to it again in a new position. The switch 5, it will be observed (the cover plate is omitted from Fig. 1), consists of a base plate 14 (which may be vertical) on which is mounted a slide 15, one end of which projects into the path of the pipe. This sliding member 15 is held to the base plate by a pin 16 which passes through a slot 17 in the slide while a spring 18 is so arranged as not only to tend to project the slide 15 into the path of the pipe 1 but also to tend to turn the pipe-end of the slide toward the axis of the pipe. The turning movement in this direction, however, is limited by a surface 19 projecting from the base plate 14 and along which 15 can slide, so that when there is no pipe in contact with the slide 15, the slide 15 is held with its projecting end in the pipe path as shown in Fig. 1. As the end of the oncoming pipe pushes against the slide 15 (Fig. 1), the slide 15 is pushed lengthwise of itself along the surface 19 and thus brought into contact with and caused to actuate a button 20 of the switch. The button 20 here pushes a bridge piece 21 against the two stationary contacts 22; a suitable spring, as illustrated, lifts the bridge piece 21 from the contacts 22 when the button 20 is relieved of the pressure of 15, and a small spring between the bridge piece and the button permits some movement of the button, if necessary, after the bridge piece strikes the stationary contacts. As the pipe continues to advance and push the slide 15 lengthwise along the surface 19, the projecting end of the slide 15 is gradually moved away from the path of the pipe, as will be apparent from Fig. 1; ultimately the end of the slide 15 leaves the path of the pipe 1 and the pipe passes underneath the slide, and the end of the slide then rests on the surface of the pipe 1. The spring 18 can now pull the slide along this surface, the slide turning partially on its pin 16. These actions will permit the switch to open again. Furthermore the slide 15 is now in a position where, under the urge of its spring 18, it tends to throw down or aside the severed piece of pipe as soon as the latter is released by the clamp. The slide 15 and the spring 18 can readily be made of such proportions that this device at 5 not only acts as a gauge, but also as a device for extracting, or assisting in the extraction, of the severed length from the machine in the manner described. The electrical circuits cooperating with this gauge switch to set the cutting tools into operation, may be of various kinds. One of these, the circuit for the machine illustrated, is described hereafter.

In the machine illustrated, so many parts as may be are driven constantly by the power shaft 30 while the operation of the intermittently-operated parts are timed by cams on the cam shaft 31. The power shaft 30 may be driven direct by a chain belt 32 leading from an electric motor 33 which may be in constant operation while the machine is in use. Whether the cam shaft 31 is driven constantly along with the power shaft 30 is dependent on circumstances; in the present instance the cam shaft is driven intermittently. It remains at rest while the pipe is being pushed through the cutting head 4 to bring a new length into position to be cut off and is then set into motion and makes one complete rotation to carry the intermittently operating parts of the machine through one cycle of the cutting operations. The cam shaft 31 is driven from the power shaft 30 through miter gears 24 and a cross lay shaft 25 which has a worm and gear connection 26 with a clutch 27; this clutch is of the kind which, when closed, causes the cam shaft 31 to be turned one complete rotation by the mechanism described, and then automatically opens to discontinue the rotation of the cam shaft. To drive the tools 6, an intermediate idler gear 28 (Figs. 1 and 2) carried in a bearing 29, connects to the power shaft 30 to the gear 24 which carries on its face the tools 6, and which is perforated at its center to permit the passing of the pipe therethrough (Fig. 6). The gear 34 is constantly driven therefore. The tools are carried in tool holders 35 which slide in guides 36 carried by individual arcuate members 37, the latter lying in corresponding recesses in the face of the gear 34 and having there attaching bolts passing through slots 38 by reason of which the tools can be adjusted by shifting the plates 37 angularly as will be apparent. The gear 34 is bolted to one end of a sleeve 40 (Fig. 1), which is carried on ball bearings 41 borne by a stationary sleeve 42 enclosing and supported by a second stationary sleeve 43 to which it is keyed; the sleeve 43 is supported in a bracket 44 into which the key extends. Between the adjacent end of the sleeve 42 and the bracket 44, is located a disc member 45 provided with a flange 46, pointing toward the gear 34. An annular shoulder 47 on the innermost sleeve 43, bears against a shoulder on the sleeve 42 so that tightening the nut 48 and thereby drawing the inner sleeve outwardly, binds the sleeve 42 against the disc 45 and the latter against the bracket 44, thus holding all rigid in place; the nut 48 can be provided with a locking feature to lock it in position, as indicated at the top of this nut in Fig. 1. The purpose of the disc 45 is to support mechanism for sliding the tool carriers 35 in their guides 36 to force the tools into the pipe at the proper time. The gear 34, it has already been noted, rotates constantly so that the tools are being constantly carried around the pipe in the cutting direction; the disc 45, it is apparent, is fixed in position. To move the tools into the pipe, the disc 45 carries a series of inclined blocks 55, all inclined in the same direction. Also on its flange 46, the disc 45 carries a sliding ring 56 having an annular member 57 carrying inclined blocks 58 complementary to the blocks 55 (see Figs. 1 and 2). Rods 59 extending loosely through the disc 45 and threaded into the ring 56 are provided with springs, as illustrated, to hold the ring 56 retracted and the inclined blocks 58 pressed against their respective complementary blocks 55. The ring 56 also carries a ring 60 providing a vertical annular face to engage a series of plungers 61 with as little friction as may be; the anti-friction ring 60 is held to the ring 56 by screw threads and locked against turning by a top plate 65 (Figs. 1 and 2) and bolts and pins as will be apparent. The plungers 61 are mounted in bosses 62 carried by the constantly rotating gear 34 and are provided with hinged sliders 63 bearing and sliding on the face of the anti-friction ring 60; their opposite ends 64 are inclined (preferably at about 45°) and extend into similarly inclined slots in the tool supports 35. With the springs on the rods 59 holding the rings 56 and 60 retracted to their leftmost position illustrated in Figs. 1 and 4, the tool holders and tools are held pulled back from the pipe 1. In order to move the tools into and through the pipe, the ring 57 is provided with an arm 68 carrying a cam roller 67 bearing on the edge of a cam 69 mounted on the cam shaft 31 (Figs. 1 and 3). When the clutch 27 is closed and the cam shaft 31 thus set into rotation (clockwise in Fig. 3), the cam 69 turns the arm 68 and ring 57 (counter-clockwise, Fig. 3), so that the inclined blocks 58 ride up the complementary inclined blocks 55 and thus slide the ring 56 and the friction ring 60 to the right in Figs. 1, 2 and 4. This forces the plungers 61 inwardly so that their inclined tips 64 push the tool carriers 35 in toward the pipe 1, and the tools 6 are thereby made to enter and make the cut and trim the pipe as they are carried around the pipe axis by gear 34. It is apparent that the rate at which the tools are pushed through the pipe depends on the shape of the cam 69, and this cam can be given such a profile as to provide the desired rate of movement of the tools at each point in their travel. As the cam shaft 31 completes its rotation, the spring 70 (Fig. 3) retracts the arm 68 and drops its roller into the low point of the cam. As this occurs the springs on the bars 59 retract the ring 56 and face ring 60, and the centrifugal action of the tool carriers 35 forces the plungers 61 to the left (keeping them against the face ring 60) and retracts the tools to their initial outer positions (Figs. 1 and 4).

The internal collet for holding the pipe while the cut is being made, one jaw of which is shown at 7, Fig. 1, is of a well known form. It may, for example, comprise a series, say three, of such jaws; these are contained within the inner support sleeve 43 and are held by the collet sleeve 71 in the well-known manner. When the collet sleeve is to the left in the position illustrated in Fig. 1, the jaws 7 are withdrawn from or do not bear hard against the pipe 1, but when the collet sleeve 73 is slid to the right, the outer inclined faces of the jaws 7 bear against corresponding internal inclined faces at the end of the support sleeve 43, so that these jaws 7 are forced against the pipe 1. The left-hand end of the collet sleeve 71 is provided with an adjusting nut 72 (Figs. 1 and 2) which has a groove 73 at each of its sides (Fig. 2). Into these grooves extend two pins 74 carried by a lever 75 pivoted at 76 (Fig. 1) and provided with a cam roller bearing against the face of the cam 77 on the cam shaft 31. A spring 78 holds the roller pressed against the cam 77. The cam is provided with a recess wherein the roller enters when the cam shaft 31 is at its rest position, and the collet sleeve 71 is then held in a left-hand position and the pipe can pass freely through the collet. The recess for the roller is a relatively short one however, and as soon as the cam shaft 31 starts into rotation, the lever 76 is turned (clockwise in Fig. 1) and thus pushes the collet sleeve 71 to the right; the cam then holds the collet sleeve in this right hand position and holds the jaws 7 tight to the pipe until the cam shaft again returns to its at-rest position.

Such an ordinary form of collet can be used in the interior of the cutting head as described. It seems to be generally understood however, that it is impossible to use two collets, or any other two ordinary forms of clamps, for machine cutting pipe, the idea being that the scraps and cuttings from the pipe will enter between the jaws of the clamps or collets (or at least the one on the outgoing side of the machine) and render the same inoperative. I have been able to make however, a clamp which does not become clogged with scraps and cuttings. Such is the clamp illustrated in Fig. 5 and used on the opposite side of the tools from the collet described. This clamp is attached to the base of the machine by the bracket 84, which is provided with a recess in a vertical wall to contain the two jaws 86 which slide to and from each other on the single rail track 87 provided at the bottom of the recess; the flanges on these blocks which extend over the two sides of the rail 87 are too short to reach the bottom of the recess 85 (see Fig. 1). A cap 88 at the top of the recess is provided with a longitudinal recess as illustrated and into this extend fins 89 rising from the two jaws or clamping blocks 86. The clamping blocks are supported therefore in upright position on a single rail track. The two clamping blocks 86 are provided with oppositely facing recesses in opposing edges of the blocks to receive the work (pipe) 1; these recesses are so shallow that a considerable space is left between the blocks 86 at all times (even when clamping the pipe); furthermore the recess in 84 containing the blocks 86 is so much longer than the combined lengths of the two blocks 86 that considerable space is left between the blocks and the two end walls of the recess 85 (see Fig. 5). A clamp of such construction having its vertical spaces of ample horizontal width for the free release of any waste or cuttings, and having no upwardly open recesses at its top or bottom in which cuttings and waste can collect, does not, I find, fill up and clog, but remains operative. A spring 90 can be used to force the two blocks 86 apart to release the pipe 1, while wedges 91 at the sides of the blocks are provided to force the blocks together and against the pipe. These two wedges are mounted on the ends of the branched lever 92, hinged at 93, and carrying a roller at its lower end bearing against the face of the cam 94 on the cam shaft 31. A spring 95 keeps the roller against the face of the cam and withdraws the wedges when the cam permits. This cam 94 is also provided with a single relatively-short recess for its roller, in such position that the wedges are withdrawn and the pipe is free to move through the clamp when the cam shaft is in its rest position; in all other positions of the cam shaft however, the lever 92 is held turned counter-clockwise slightly from the position shown in Fig. 1, so that the clamping blocks 86 engage and firmly hold the pipe 1.

As before indicated, the guide rollers 2 and 3 may also be feed rollers for propelling the pipe through the cutting mechanism, and they are so illustrated. The roller 2 is fastened on a short shaft 100, which also has fastened to it a gear 101. This shaft 100 is mounted in two bearing boxes 102 and 103, respectively riding in guide frames 104 and 105. An elevating screw 106 is connected to the box 102 and projects through a nut in the top of the frame 104. Similarly an elevating screw 107 is connected to the box 103 and projects through the top of the frame 105. The two screws 106 and 107 are inter-connected by gear wheels, as illustrated, so as to turn together to raise and lower the boxes 102 and 103 and shaft 100 and roll 2, when the hand wheel 108 on the screw 106 is turned. Similarly, roller 3 is mounted on a short shaft 109 similarly carried in boxes in the guide frames 104 and 105, below the boxes already described, and independent elevating screws 110 provide for raising and lowering this roller 3. Similar to 101 a gear is fastened to the shaft 109 and these two gears intermesh respectively with two inter-meshing gears 111 and 112 (Fig. 1), the latter being mounted on a shaft 113 carrying a mitre gear 114 which meshes with a mitre gear 115 connected to the vertical shaft 116 (Figs. 2 and 3). The shaft 116 is carried in a bearing in a lower bracket 118 and also in a bearing at 119 in the machine frame. The shaft 116 has keyed on it a sliding clutch member 117, while the cooperating clutch member 120 and its connected mitre gear 121 are so mounted on shaft 116 as to turn freely on that shaft. The gear 121 meshes with the mitre gear 122 fastened to the shaft 25. The shaft 25 being in constant rotation while the machine is in operation, the loose clutch member 120 is likewise in constant rotation, and drives the sliding clutch member 117 and hence the feed rollers, except when the sliding clutch member 117 is raised by the clutch fork 123 (Figs. 2 and 3) which is carried by the rock shaft 124 extending cross-wise of the machine. From this rock shaft 124 depends an arm 125 which carries a roller engaging with the face of the cam 126 on the cam shaft 31, the roller being pressed against the face of the cam and the fork 123 normally held in such a position as to engage the sliding clutch member 117 with the driving clutch member 120, by a spring 127 reaching to the manual operating handle or lever 128; by this handle the operator can disengage the clutch 117—120 at will and thus control the movement of the pipe. The face of the cam 126 is provided with a single recess which is so located that when the cam shaft 31 is at rest, the clutch member 117 is held in engagement with the driving clutch member 120, but in all other positions of the cam shaft 31, i. e. when it is rotating, the sliding member 117 is raised out of engagement with the driving member 120 and hence the feed rolls 2 and 3 are left at rest. Thus the feed rolls 2 and 3 are driven (except when stopped manually by handle 128) at all times except when the shaft 31 is in operation and the cuts are being made.

The clutch 27, which connects and disconnects the cam shaft 31 to and from the constantly driven lay shaft 35, as before described, is closed by a push to the right on the lower end of the clutch lever 134 (Fig. 1). A solenoid 135 is provided for thus actuating the lever 134 to engage the clutch under the control of the electrical circuits, the armature of this solenoid thrusting out the rod 136 when the solenoid is energized and the spring 137 returning the armature when the solenoid is again de-energized. As before mentioned, one closing of the clutch 27 causes the shaft 31 to make one complete rotation and carry the operation of the machine through a complete cutting and trimming cycle, and thereupon the clutch opens automatically. Figure 8 illustrates the electrical circuits. In Fig. 8, as in Fig. 1, the driving motor of the machine is marked 33. The incoming power lines are shown at 142, with a hand switch 143 for connecting the motor 33 and the machine circuits to these lines. Connected to suitable points on the lines leading to the motor, are leads 144 going through the electromagnetic switch 145 to the clutch-operating solenoid 135. This switch 145 is biased open and will be closed by solenoid 146 to energize solenoid 135, by a closing of the gauge switch 5 as will be apparent from Fig. 8. In parallel with the gauge switch 5 I usually provide also one or more normally open manual switches 148 at convenient places about the machine whereby the operator can initiate the cutting operation at any time to cut out bad spots or cut lengths shorter than would be cut by any given setting of the gauge switch. These switches 5 and 148 energize 146 and close switch 145 momentarily; to assure 145 being held closed a sufficiently long time for the solenoid 135 to actuate the clutch lever 134, I provide a holding circuit 149 completed by an additional contact 150 moved with 145 and cooperating fixed contact 151, and containing a normally closed switch 138 which is opened by the machine itself after the cam shaft 31 has started turning. The switch 138 (see Fig. 3) is mounted close to the cam 94, and the latter is provided with a pin or step 139 which strikes and momentarily opens switch 138 shortly after cam shaft 31 starts to turn. As soon as the pin 139 passes the switch, the switch closes again. When the cam shaft 131 is at rest therefore and the pipe is being fed through the clamps, the electrical parts are in the position shown in Fig. 8. When the end of the pipe strikes the gauge 5 and closes that switch (or the operator closes one of the manual switches 148), the coil 146 is energized and this closes the switch 145, giving energy to the clutch solenoid 135; at the same time the switch arm 150 contacts with the point 151 of the holding circuit 149, so that a circuit through the switch solenoid 146 remains completed even after the gauge switch 5 (or the manual switch 148) is opened. The holding circuit remains closed (keeping energy on clutch solenoid 135) until the pin 139 on the cam 94 strikes the normally closed switch 138 as before described; the momentarily opening of the switch 138 deenergizing the coil 146 and permits the switch 145 to open (under the pull of its spring shown), both breaking the contact of 150 with 151 and de-energizing the clutch solenoid. The parts are now restored to the positions illustrated in Fig. 8, ready for the beginning of another cycle.

The operation of the machine may be briefly described as follows: The tools 6 having been set in the sliding carriers 135, and suitably adjusted as to their protuberance from the carriers 135 and with respect to their angular position, which is adjustable by turning of the arcuate members 37, the switch 143 (Fig. 8) of the power lines is closed, thus setting the motor 33 into action. This begins the rotation of the power shaft 30, the rotation of the gear 34 carrying the cutting tools 6, and the rotation of the feed rolls 2 and 3. The cutting tools are held retracted from the pipe however, and a pipe being introduced to the rolls 2 and 3, the latter feed the pipe through the cutting head until the end of the pipe strikes the gauge switch 5. The pipe, continuing to move forward, then slides the member 15 upwardly and to the right closing the bridging member 21 on the contacts 22, and the sliding member 15 comes to rest with its lower end on the outer surface of the pipe and with the switch 21—22 open as before explained. This momentary closing of the bridging member on the contacts 22 however, has energized the coil 146 (Fig. 8), thus closing the switch 145 and causing the energization of the clutch solenoid 135 so that the armature of this last solenoid closes the clutch 27; incidentally, the holding circuit 149 has come into operation to assure the full action of the clutch solenoid. The cross shaft 25 being in constant driving connection with the shaft 30 and hence in constant rotation, this closing of the clutch 27 starts the cam shaft 31 in rotation. Shortly after this rotation is begun, (i. e., shortly after the firm closing of the clutch 27 is assured), the pin 139 on cam 94 (Fig. 3) strikes the projecting point of the normally-closed switch 138 and thereby opens this switch so as to bring about the de-energization of the clutch solenoid 135 in the manner before explained. The clutch 27 however remains closed. About as soon as the cam shaft 31 starts in rotation, the cam 126 actuates the lever 125 so as to separate the sliding clutch member 117 from the loose clutch member 120, thus stopping the feed rolls 2 and 3 and the further progress of the pipe. Immediately thereafter, or about simultaneously therewith, the cams 77 and 94 respectively actuate the levers 76 and 92 to cause the internal collet and the clamp jaws 86 to engage the pipe and hold it firmly in place. At least as soon as these clamps are set, the cam 69 actuates the levers 68 to turn the ring 57 so as to begin the movement of the tool holders 35 toward the pipe. This last movement continuing, the tools 6 are forced into and ultimately through the walls of the pipe (the constant rotation of the gear 34 carrying the cutting tools around the axis of the pipe in the meantime); in the first stage of their movement the cutting tools cut through the pipe and in the last stage of their movement the cutting edges 13 of the tools are forced against the new ends of the pipe and trim the latter. As soon as one rotation of the cam shaft 31 is completed (the tools 6 by that time having been forced completely through the wall of the pipe and the pipe ends trimmed), the clutch 27 automatically opens; this stops the rotatation of the cam shaft 31 in such a position that the parts are returned to the respective positions shown in the drawings. The releasing of the clamping jaws 86 permit the newly cut-off length of pipe 1 to be taken out of the jaws, or thrust out by the downward thrust of the spring 18 acting on the sliding member 15 which now presses on the top of the pipe. This completes the cycle, and the pipe again moves forward to bring its new cut-end to the gauge and begin a second cut.

It will be understood that my invention is not limited to the details of the machine illustrated and described, except as hereinafter appears in the claims.

Claims:

1. In machine of the kind indicated, the combination of a cutting tool, a cam shaft to direct the operations of the machine, constantly operating power means for driving the cam shaft and also for driving the cutting tool to make the cut, and means to couple the cam shaft to said power means to initiate the cutting of the work and disconnect the cam shaft from the power means at the completion of each cut.

2. The combination of claim 1, characterized by the fact that the cutting tool is permanently connected to the power means so as to be constantly driven by the power means.

3. In a machine of the kind indicated, a cutting tool, a cam shaft to direct the operations of the machine, means for feeding the work to the tool, a constantly operating power means to drive the cutting tool, cam shaft and work-feeding means, and means to couple the cam shaft to the power means to initiate the cutting of the work and to disconnect the cam shaft from the power means at the completion of the cut, said cam shaft disconnecting said work-feeding means from the power means as the cam shaft begins its motion and reconnecting the two as the cam shaft reaches the end of its motion.

4. In a cutting machine of the kind described, the combination of a cutting tool, a cam shaft to direct the operations of the machine, a power shaft which is driven constantly both during and between successive cutting operations to furnish the power for the cutting operations and also to drive the cam shaft, and a device to couple the cam shaft to said power shaft to begin each cut and to uncouple the cam shaft from the power shaft at the finish of each cut, whereby the cam shaft is driven intermittently.

5. The subject matter of claim 4, characterized by the fact that the cam shaft, during a single rotation, brings about a complete cycle of operations of the machine, and that the coupling device is a clutch which, when closed, continues closed for substantially a single complete rotation of the cam shaft and then automatically opens and permits the cam shaft to stop.

6. In a cutting machine of the kind indicated, a constantly driven power shaft, a tool constantly driven by the power shaft, a cam shaft, a clutch means for rotating the cam shaft, feed rolls, a clamp for fastening the work in a fixed position with respect to the supporting means for the tool, means for moving the tool toward and from the work, and cams on the cam shaft for directing the operation of the feed rolls, said clamp, and said means for moving the tool toward and from the work.

7. In a cutting machine of the kind indicated, a cutting tool having a cutting edge adapted to cut the work in a direction to permit the tool to enter into the work and a cutting edge to trim a side of the cut made by the first mentioned edge, and means for feeding the tool with respect to the work to make said cuts.

8. In a cutting machine of the kind indicated, a cutting tool, means for sliding the tool in a direction to enter into the work and for moving the tool transversely of the work, the cutting tool having a cutting edge at the end of the tool adapted to cut the work to permit the tool to enter the work and a cutting edge at the side of the tool to trim a side of the cut made by the first mentioned cutting edge.

9. The subject matter of claim 7, characterized by the fact that there are two tools, and that each has a cutting edge to trim a side of the cut and these two edges of the tools trim opposite sides of the cut.

10. In a cutting machine, a cutting tool, a solenoid to cause the tool to make a cut, and a switch controlling the energization of the solenoid, said switch having a member located in the path of the work and movable by the work to actuate the switch.

11. In a cutting machine, a cutting tool, a solenoid to cause the tool to make a cut, a switch to control the energization of said solenoid, a member, to be struck by the work to actuate the switch, capable of sliding at an angle to the path of travel of the work and of being turned to permit the return of member in contact with the outer surface of the work after it has been pushed out of the path of the work, and a spring forcing the member against the outer surface of the work.

12. The subject matter of claim 10, characterized by the fact that said member actuates the switch contacts through an interposed spring which permits some continued movement of said member after the movable contact of the switch has reached the end of its movement.

13. In a pipe-cutting machine in which the severed pieces are removed through one of the clamps, a cutting tool, and a clamp for engaging the work close to the tool at each side of the tool, characterized by the fact that the clamp on the work-discharge side of the tool has no upwardly-open-recess and the clearances between its relatively-movable parts are ample, measured in a horizontal direction, to prevent the clogging of the clamp by cuttings.

14. In a cutting machine of the kind indicated, a cutting tool, and a clamp for engaging the work at each side of the tool, characterized by the fact that the clamp on the work-discharge side of the tool comprises two horizontally-sliding jaw blocks, a single-track guide below the blocks, the latter extending down over the sides of said guide, and portions extending down sides of the blocks near the top of the blocks.

15. The subject matter of claim 14, further characterized by the fact that the jaw-blocks are moved toward each other by a wedge or wedges.

16. In a cutting machine of the kind indicated, a rotating cutter head open to permit the work to pass therethrough, tools thereon slidable toward and from the work, individual plungers on the head to slide the respective tools, a non-rotating ring against which the plungers ride, said ring being coaxial with the cutter head, and means for moving the ring toward and from the cutter head to move the plungers to move the tools.

17. The subject matter of claim 16, characterized by the fact that said means includes inclined blocks movable circumferentially of the axis of said cutter head and ring.

18. The subject matter of claim 16, in combination with means for rotating the cutter head while the work is being fed to the cutting position, the ring-moving means moving the ring to slide the tools to the work when a cut is to be made.

19. In a cutting machine of the kind indicated, a hollow support, a clamp for the work within said support, a second clamp for the work in axial alignment with the first mentioned clamp, a rotating cutter head mounted on said support, and a tool on said cutter head to cut the work in the space between the said two clamps.

20. The subject matter of claim 19 in combination with means for feeding the work through said support and thence to the second mentioned clamp.

21. In a machine of the kind indicated, a rotating cutter head, a tool thereon movable toward and from the axis of rotation of the cutter head, means to move the tool on the head to make the cuts while the head is rotating, two work clamps close to the tool, one at each side of the tool, means for feeding the work to cutting position, and a control element to direct the action of the tool-moving means, and to direct the action of the clamps and the feeding of the work by said feeding means.

22. In a machine of the kind indicated, a rotating cutter head, a tool thereon movable toward and from the axis of rotation of the cutter head, a rocking element to move the tool on the head, two work clamps, one at each side of the tool, means for feeding the work to the tool, and a cam shaft to rock said rocking element and direct the opening and closing of the clamps and the feeding of the work by said means.

23. In a cutting machine for severing bars, pipes, etc., two spaced clamps for the work, and cutting means adapted to sever the work in the space between the clamps and then to cut into the work at both sides of the severing cut to trim.

24. In a machine of the kind indicated, a cutting tool having a cutting edge adapted to cut the work in a direction to permit the tool to enter into the work and a cutting edge to trim a slide of the cut made by the first mentioned cutting edge, and means to move the tool to carry the second mentioned cutting edge into the work at a side of the cut made by the first mentioned cutting edge.

25. In a machine of the kind indicated, a cutting tool having a cutting edge adapted to cut the work in a direction to permit the tool to enter into the work, a side of the cutting tool projecting axially from said cutting edge and there being provided with a cutting edge to trim the adjacent side of the cut, made by the first mentioned cutting edge, as the tool is forced farther into the work.

In testimony whereof, I have signed this specification.

JOHN F. LAWSON.